Inventor
CHARLES HOLLERITH
By Beaman & Langford
Attorneys

Patented May 12, 1942

2,282,359

UNITED STATES PATENT OFFICE 2,282,359

AIRPLANE WHEEL

Charles Hollerith, Jackson, Mich., assignor to Hayes Industries, Inc., Jackson, Mich., a corporation of Michigan Application August 8, 1940, Serial No. 351,852

2 Claims. (Cl. 301—5)

The present invention relates to wheels for airplanes and more particularly to wheels arranged to have the internal recesses thereof sealed against the entrance of water from the exterior thereof and to maintain the internal recesses at the pressure of the outside atmosphere regardless of the elevation of the airplanes.

Attempts have been made to prevent the entry of water into the wheels and particularly those used on amphibian airplanes for the water not only interferes with the operation of the brakes which are housed within the wheels, but also its presence within the wheels is undesirable for other reasons including the unbalancing of the wheels when rotating at high rates of speed and its damage to bearing structures.

Previous attempts have been made to prevent the entrance of water by sealing the wheels. Practically, it is very difficult to obtain a complete sealing due to the changing atmospheric pressures as the airplane ascends and descends. Should air under relatively higher pressure within a wheel escape while an amphibian airplane is at an elevated position as it sometimes does, when the airplane alights on water and the wheels are submerged, the then relatively higher outside pressure will force water into the wheel. The same problem might be encountered with land planes should there be an excess amount of surface water on a landing field. According to the present invention wheels are sealed but the interior recesses of the wheels are maintained at the pressure of the atmosphere outside the wheels by breather connections terminating above all normal water levels or within the body of the airplane. The result of this arrangement is to reduce the strain on the sealing means resulting from varying relative inside and outside wheel pressures, and thus to reduce the likelihood of the leakage of water into the wheels.

An object of the present invention is to provide a sealed hollow wheel arranged to maintain the pressures inside and outside of the wheel the same.

Another object of the invention is to provide a sealed hollow wheel for airplanes having a breather connection communicating with the interior of the wheel and terminating above the normal water level or within the body of the airplane to maintain equal inside and outside wheel pressures.

Figure 1:
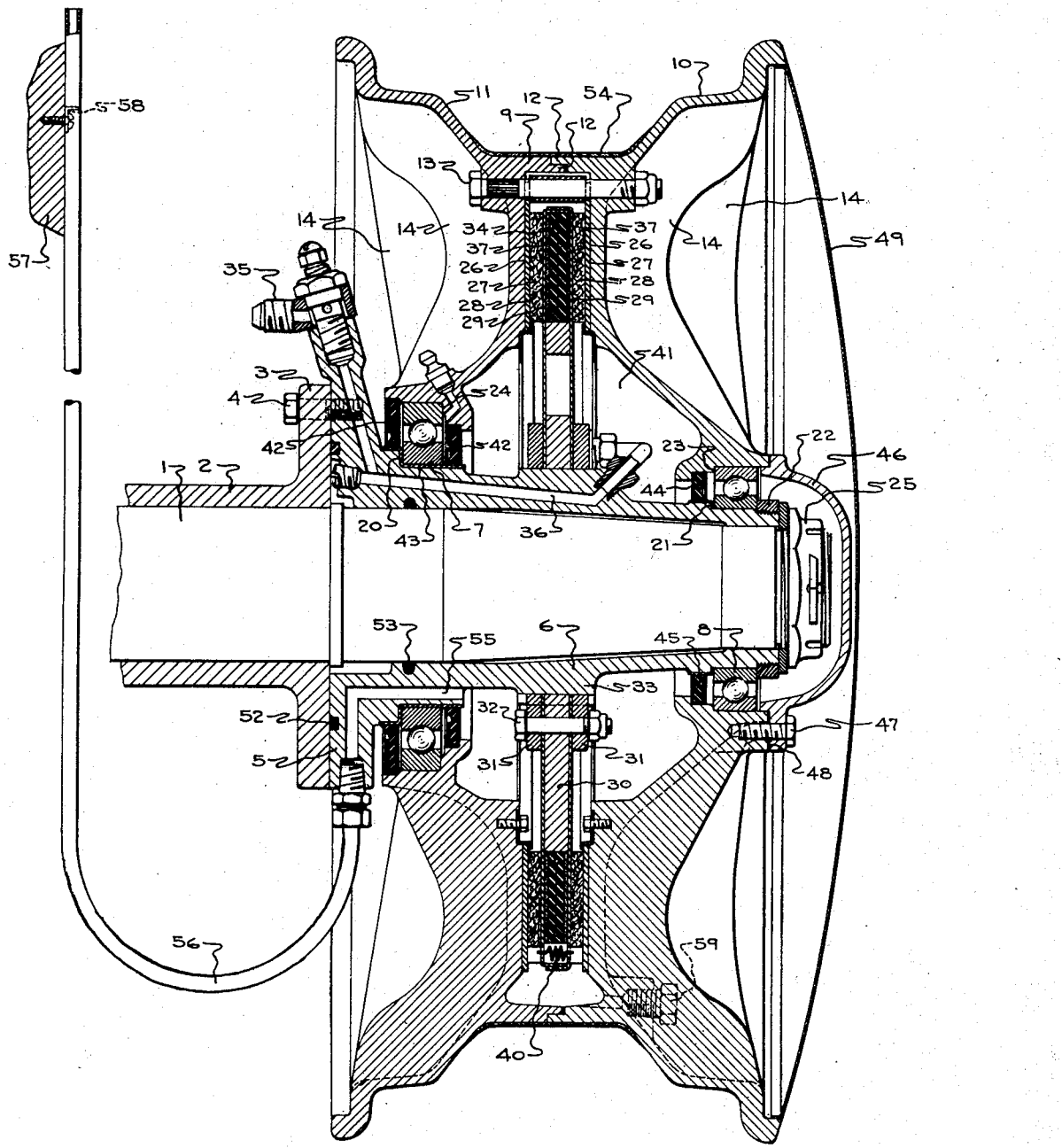
Figure 2:
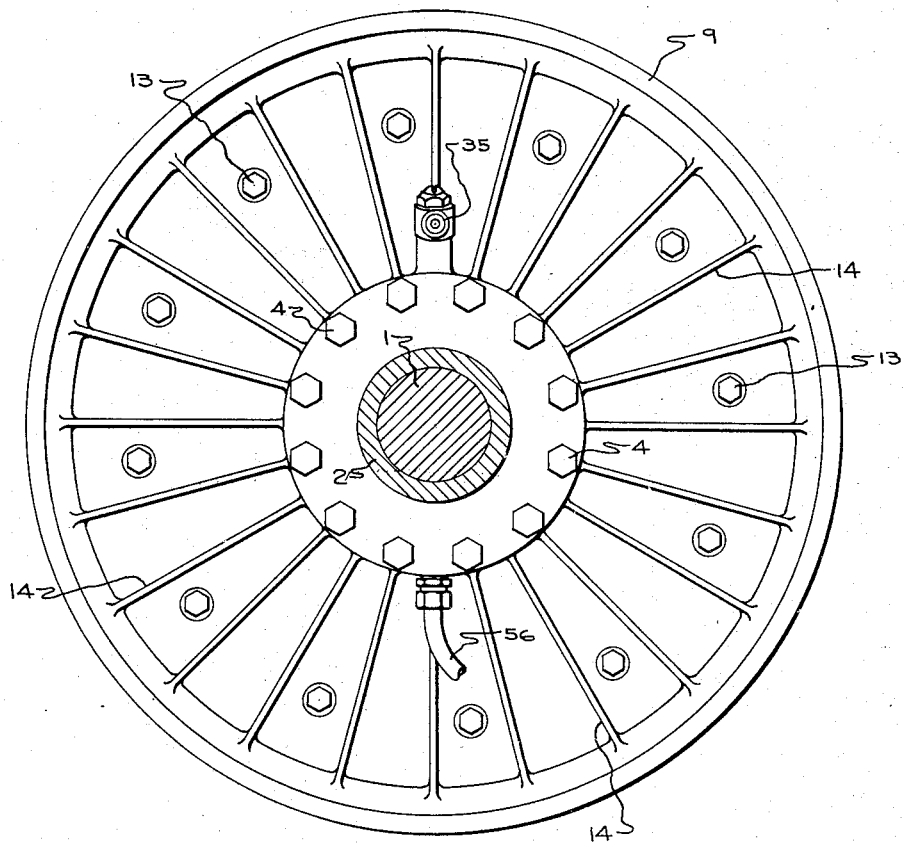

These and other objects residing in the arrangement, combination and construction of the parts will be apparent from the following specification when taken with the accompanying drawings in which:

Fig. 1 is a vertical section of an airplane wheel equipped with the breather according to the present invention, and Fig. 2 is a side elevation thereof.

Referring particularly to the drawings, the reference character 1 indicates an axle suitably secured in a portion of the frame 2 of an airplane. The frame 2 is provided with a flange 3 secured by screws 4 to a flange 5 of a sleeve 6 disposed about the projecting portion of the axle 1. The sleeve 6 has supported thereon through inner and outer bearings 7 and 8 respectively, a wheel 9 consisting of halves 10 and 11 having overlapping and abutting portions 12 and clamped together by bolts 13. The halves 10 and 11 are provided with suitable reinforcing webs 14.

The sleeve 6 is provided with a shoulder 20 for limiting inward movement of the inner bearing 7. The sleeve 6 is also provided with a shoulder 21 for limiting inward movement of the outer bearing 8. A nut 22 threaded on the outer end of the sleeve 6 clamps the bearings 7 and 8 on the sleeve 6, the clamping of the bearing 7 being through the wheel 9 and the shoulders 23 and 24 thereon. A nut 25 threaded on the outer end of the axle 1 additionally serves to maintain the axle 1 and wheel 9 in assembled relation.

The wheel 9 is provided with two internal annular opposed surfaces 26 against which are suitably supported annular braking rings 27 which may be of cast steel or some other suitable material. For cooperation with the braking rings 27 are brake shoes 28 supported on the outer end of resilient annular plates 29. The plates 29 are separated by an annular ring 30 and are clamped together by annular rings 31 and a plurality of circumferentially spaced bolts 32 projecting through the annular rings 31, the plates 29 and the annular ring 30. The annular rings 31, the plates 29 and the annular ring 30 are splined on an annular boss 33 comprising an integral part of the sleeve 6.

For urging the brake shoes 28 into contact with the braking ring 27 there is provided an annular hollow rubber tube 34 for receiving a hydraulic brake fluid under pressure. Hydraulic fluid is conducted into the tube 34 through a fitting 35 at the outside of the wheel and a conduit 36 within the sleeve 6. The specific connection between the conduit 36 and the interior of the tube 34 is not shown since this feature does not comprise a portion of the invention but will be understood by those skilled in the art. When hydraulic fluid is admitted under pressure into the tube 34, the tube 34 expands and urges the brake shoes 28 against the braking rings 27 to brake the wheel. Annular heat insulating pads 37 are disposed between the tube 34 and the plates 29 to prevent heat from the brake shoes 28, generated during braking, from damaging the tube 34. As shown particularly in Fig. 1, the resilient plates 29 have connected therebetween, adjacent their peripheries, a plurality of circumferentially spaced helical springs 40, for the purpose of drawing the plates 29 resiliently together so that when pressure in the tube 34 is released the brake shoes 28 will be drawn from contact with the braking rings 27.

The interior chamber 41 within which the brake structure is housed is sealed to prevent the entrance of water thereinto. The bearing 7 is provided on opposite sides thereof with annular grease seals 42 which bear against an annular seat 43 on the sleeve 6, the seat 43 also having a portion serving as a seat for the bearing 7. The bearing 8 is provided with an annular grease seal 44 which seats on an annular ring 45 on the sleeve 6. The grease seal 44 is on the inside of the bearing 8, the outside of the bearing 8 being sealed from the exterior by a cap 46 clamped to the wheel 9 by screws 47. A gasket 48 is disposed between the cap 46 and wheel 9. A conventional fairing 49 covers the outside of the wheel 9 and the cap 46 and is secured to the wheel 9 by some conventional securing means. In order to prevent the leakage of water between the sleeve 6 and the axle 1, there is provided between the flanges 3 and 5 a sealing ring 52 and between the axle 1 and the sleeve 6 is provided a sealing ring 53. The sealing rings 52 and 53 and the grease seals 42 and 44 may be constructed if desired from an artificial rubber compound impervious to oils. The wheel 9 has about the base of the felly an asbestos pad 54 for preventing the passage of heat from the brake mechanism to the tire (not shown). The pad 54 with the tire serve to seal the joint formed by the portions 12.

Providing communication between the chamber 41 and the exterior of the wheel 9 is a conduit 55 within the sleeve 6 and the flange 5. A breather tube 56 has one end thereof connected to the outer end of the conduit 55 and the other end thereof connected to a frame portion 57 of the airplane with which the wheel 9 is associated, by a clamp 58, above all normal water levels on the airplane or within the body thereof. The effect of the breather tube 56 and the conduit 55 is to maintain the pressure within the chamber 41 equal to that of the outside atmosphere in which the wheel is disposed. The breather tube 56 not only has the effect of preventing a reduced pressure within the wheel at elevated levels which upon descent to the water would tend to draw water into the interior of the wheel, but also prevents strain on the sealing means employed to seal the interior of the wheel thereby prolonging their lives and reducing the tendency to leakage thereby. By the employment of the breather tube 56 it has been found that rugged sealing structures for keeping out water may be for the most part omitted and the load for water sealing placed on grease seals.

For the purpose of draining out any water which may have leaked into the chamber 41 there is provided adjacent the outer periphery of the chamber 41 a drain plug 59.

While the invention has been described as associated with one particular form of wheel, it will be understood that it may be associated with any type of wheel having a hollow interior whether the wheel is for use on an amphibian airplane, land airplane or otherwise. Accordingly, I do not wish to be limited except by the scope of the following claims.

I claim:

1. In an airplane, a wheel having a hollow interior housing brake structure or the like, means sealing said interior against the entrance of water, and a vent comprising conduit means providing a free communication between the interior of said wheel and a position on said airplane above the level reached by water under normal conditions of use for maintaining the pressure in said interior equal to that outside of the airplane.

2. In an airplane, a wheel having a hollow interior housing brake structure or the like, a hub for said wheel, an axle projecting through said hub, bearings mounting said wheel on said axle, means associated with said wheel sealing said interior against the entrance of water, and a vent comprising conduit means providing a free communication between the interior of said wheel and a position on said airplane above the level reached by water under normal conditions of use for maintaining the pressure in said interior equal to that outside of the airplane.

CHARLES HOLLERITH.